March 19, 1929.  T. D. THAWLEY  1,706,004
CORN CUTTER AND SHOCKER
Filed Dec. 1, 1927  4 Sheets-Sheet 4

Inventor:-
Thomas D. Thawley.

Patented Mar. 19, 1929.

1,706,004

UNITED STATES PATENT OFFICE.

THOMAS D. THAWLEY, OF CHESAPEAKE CITY, MARYLAND, ASSIGNOR TO GEORGE W. PETERSON, OF CHESAPEAKE CITY, MARYLAND.

CORN CUTTER AND SHOCKER.

Application filed December 1, 1927. Serial No. 237,081.

The present invention relates to improvements in machines for harvesting plants growing in rows, such as corn, and has for its object to provide a machine which will comprise a minimum number of parts and will act, as it is drawn forward, to simultaneously cut the stalks of plants in adjoining rows and assemble the cut stalks in a suitable receiver so as to permit them to be bound into shocks.

The machine includes means by which the stalks cut from the two rows will be automatically transported to the receiver at the rear of the machine and the latter is provided with a hinged bottom by manipulating which the shocks may be easily deposited upon the ground.

Means are also provided whereby bent plants or stalks are lifted to substantially upright position, automatically, so as to be positioned directly in the path of the cutters with which the machine is provided and the entire mechanism is of strong and durable, though simple, construction.

In the accompanying drawings:—

Figure 6 is a side view of the forward lower end of one of the guide members.

Figure 1:
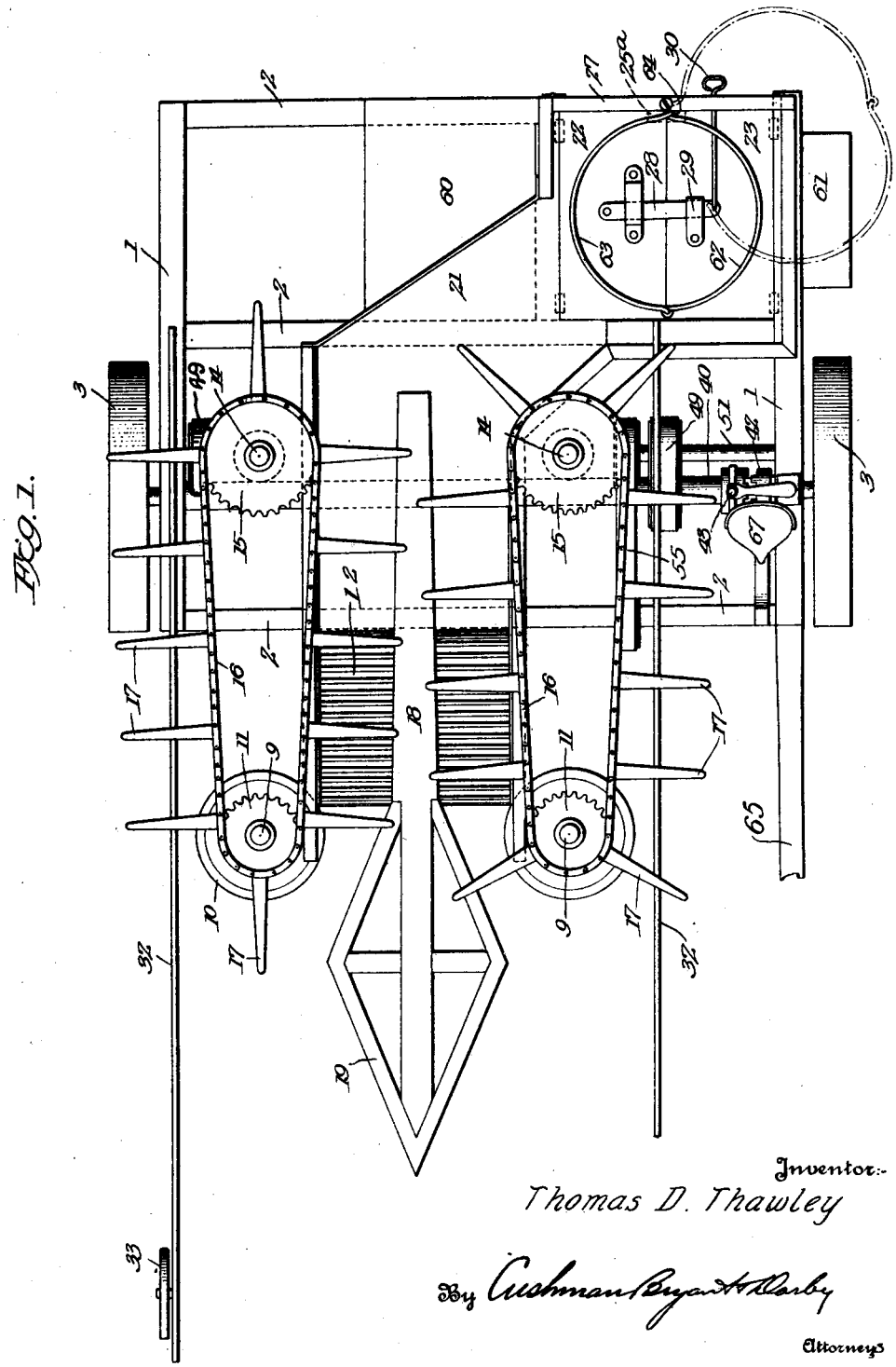
Figure 1 is a plan view of a corn harvester embodying the present invention.

Referring to the drawings, in the several views of which like reference characters designate corresponding parts, the machine comprises a main supporting frame including longitudinal sills 1, and suitable transversely extending connecting sills 2, such frame being supported on ground wheels 3 mounted at the ends of an axle 4, which is journaled in suitable bearings formed in the side sills 1.

An auxiliary frame 4′ extends forward from the front transverse member 2 of the main frame and includes two uprights 5, which are connected by frame members 6 with uprights 7, 8, on the main frame. Two vertical cutter shafts 9 are supported in suitable bearings on the frame 4′ and frame member 6, and to the lower end of each of said shafts, below the plane of the main body frame of the machine, is secured a disk cutter 10. The shafts 9 extend upward some distance above the framework of the machine and at its upper end each is provided with a sprocket 11 that will be hereinafter more particularly referred to.

The cutter shafts 9 are spaced apart approximately the distance separating two rows of the plants to be cut so that as the machine is advanced the disk cutters 10 will simultaneously sever the stalks of plants in two adjoining rows.

The machine is provided at its forward end, between the cutter shafts 9 with an endless conveyor 12 adapted to support the butts of the stalks severed by the cutters 10 and to carry such stalks from adjacent the cutters to a platform or floor formed on the main body frame of the machine. As shown, this conveyor is inclined upward, rearwardly, from its front end and is supported on suitable rollers mounted in the main frame and in auxiliary frames 13 that are secured to, and depend from, the main body frame. Mounted in suitable bearings on the supporting frame, in rear of the cutter shafts 9 are two vertical shafts 14 which are, respectively, in longitudinal alignment with the cutter shafts and each of which is provided at its upper end with a sprocket 15. Endless chains 16 are fitted about the sprockets 11, 15, of the longitudinally aligned shafts 9, 14, and each of said chains is provided with laterally extending fingers 17 adapted to assist the conveyor 12 in moving the severed stalks rearward from adjacent the cutters 10.

The fingers 17 are of such length that they will extend substantially to the mid line of the space between the chains 16, but will not interfere one with the other as they move rearward therein. This space is divided into two channels or passages by a suitable partition including at its top a member 18 which extends forward beyond the front end of the machine and to such projecting portion are secured members forming a spear-shaped head 19. This head extending beyond the front end of the machine will act to separate the leaves of the plants in the adjoining rows and guide the stalks in such rows, that may lean inward, to an upright position in the path of the cutter disks 10. Plates 20 may be secured to the several uprights of the frame to form with the partition 18 closed side walls for the channels referred to through which the cut stalks are moved rearward. At their rear ends such channels communicate through a throat 21 with a receiver in which a series of the severed stalks will be collected and supported in an upright position so that they may be readily bound into suitable shocks. A suitable floor is provided on the main frame for the channels and throat referred to and the chains 16 engaging the upper portions of the severed stalks will act to transport said stalks in substantially vertical position over said floor to the receiver.

The receiver comprises a bottom including two swinging sections 22, 23, hinged to the main frame, and frame members such as 24, 25, and 26, which form an enclosure rising from the hinged bottom and communicating with the throat 21 leading from the channels through which the cut stalks are moved by the chains 16.

Means are provided whereby the two swinging bottom sections 22, 23, of the receiver may be connected when in horizontal position so that the weight of the stalks collected in said receiver will be supported. As shown, the transverse frame members 25, 27, are hinged to a portion of the main frame and the former is provided on its inner face with a projection 25ᵃ that will extend beneath the two bottom sections 22, 23, when the parts are in the relation shown in Figures 1 and 2. Said projection 25ᵃ which serves as a support for the bottom sections 22, 23, extends as shown across the meeting lines of said sections, and said floor sections are further connected by a manually adjustable latch 28, which is pivotally mounted on the floor section 22 and adapted to be moved to and from a position beneath a keeper 29 on the floor section 23 by a suitable rod or handle 30.

The machine is provided with means for lifting any plants that may have been deflected outward from a substantially vertical position, in the rows in the path of the cutters, so that when the stalks are severed such plants will be brought into the path of the fingers 17 on the chains 16. As shown, this lifting means comprises two guide members having horizontal portions 31 connected to uprights on the main frame, at the sides thereof, and downwardly and forwardly inclined sections 32. These inclined sections extend some distance in advance of the machine and at their forward ends are preferably mounted on caster wheels 33. It will be seen that as the machine is moved forward the inclined portions 32 of said guides will act to lift or raise to a substantially vertical position any plants that may have fallen outward from the rows being cut and that the stalks thereof will be brought clearly into the path of the cutters 10 and the portions above such cutters positioned to be engaged by the fingers 17 of the chains 16.

Figure 4:
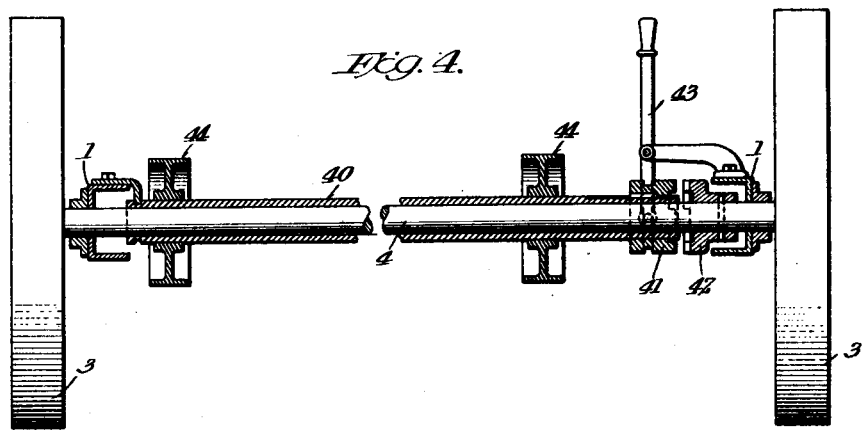
Figure 4 is a view partly in section illustrating the connection between the main shaft and the vehicle axle.
Figure 5:
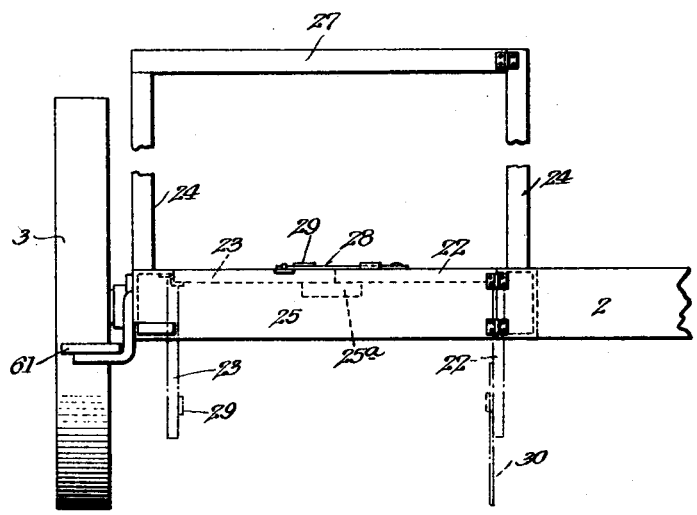
Figure 5 is a rear elevation of a portion of the machine.

Power for actuating the cutters and conveying devices of the machine may be, as shown, obtained from the axle 4 of the ground wheels 3. As shown in Figure 4, a sleeve 40 is fitted about the axle 4 and on said sleeve is splined the movable member 41 of a suitable clutch, the relatively stationary member 42 of which is secured to the axle 4. By means of a hand lever 43 the sleeve 40 may be readily engaged or disengaged with the axle 4 so that it can rotate therewith or remain stationary. On the sleeve 40 are secured two pulleys 44 which are connected by cables 49 with similar pulleys 50 mounted on countershafts 51, supported in bearings in the uprights on the main frame. To the inner ends of the shaft 51, are secured bevel pinions 52 which mesh with similar pinions 53 on the vertical shafts 14.

Therefore, when the clutch is in position to connect the sleeve 40 to the axle 4 the shafts 14 will be positively rotated and through the sprockets 15, 11, and chains 16, the cutter shafts 9 will be similarly actuated.

Any suitable means may be employed for driving the conveyor 12. As shown, a pulley 54 on the rear, upper, supporting roll of said conveyor is connected by a cable 55 with a pulley 56 on the countershaft 51, and thus all of the moving parts of the machine may be driven from the ground wheels 3.

Platforms 60, 61, on which operatives may stand are provided at opposite sides of the receiver.

To the upper rearwardly swinging member 27 of the receiver is permanently connected a shock compressor. This, as shown, comprises a rod 62, bent into substantially semi-circular form and pivotally connected to the upper edge of the frame bar 27. To the end of the member 62 is flexibly connected a similarly shaped member 63, the free end of which is deflected out as at 64 to provide a handle by which it may be manipulated. When the desired number of stalks has accumulated in the receiver the compressor 62, 63, may be manipulated to surround and compress such stalks sufficiently to permit a suitable binding means to be secured thereabout. This compressing device is normally in the position shown in dotted lines in Figure 1; but when a sufficient number of stalks have been collected, the operator grasps the handle 64 and draws the semi-circular member 62, 63, about the collected stalks and into the position shown in full lines in Figure 1, thereby confining the stalks within the hoop thus formed and enabling them to be readily tilted into the shocks.

As shown, the machine is intended to be drawn forward by pull exerted on a suitable tongue 65.

The machine is shown as provided with a suitable seat 67 adjacent the clutch lever 43, so that a single attendant can drive the team connected to the tongue 65 and manipulate said clutch lever as required.

Figure 2:
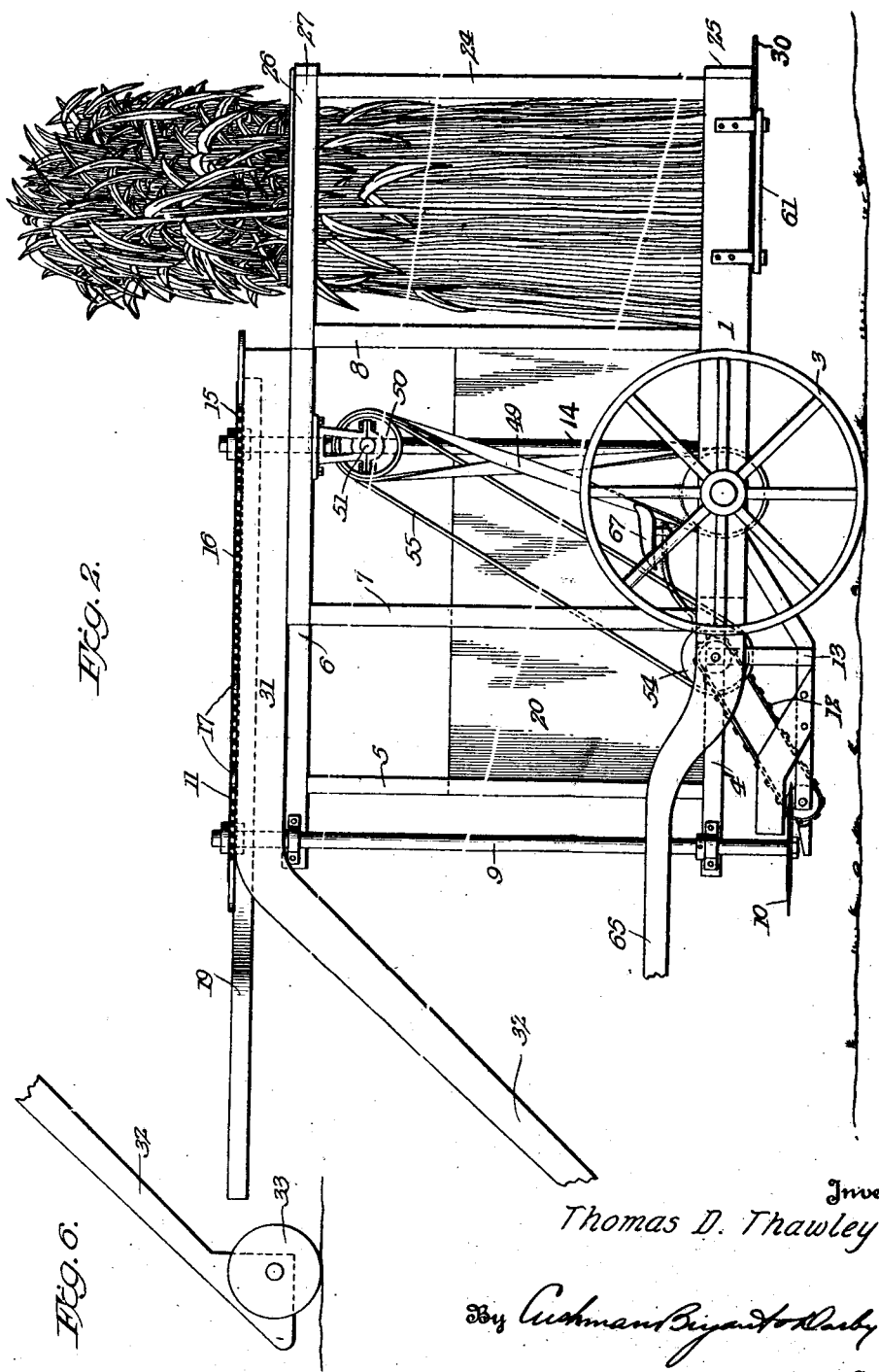
Figure 2 is a side elevation.
Figure 3:
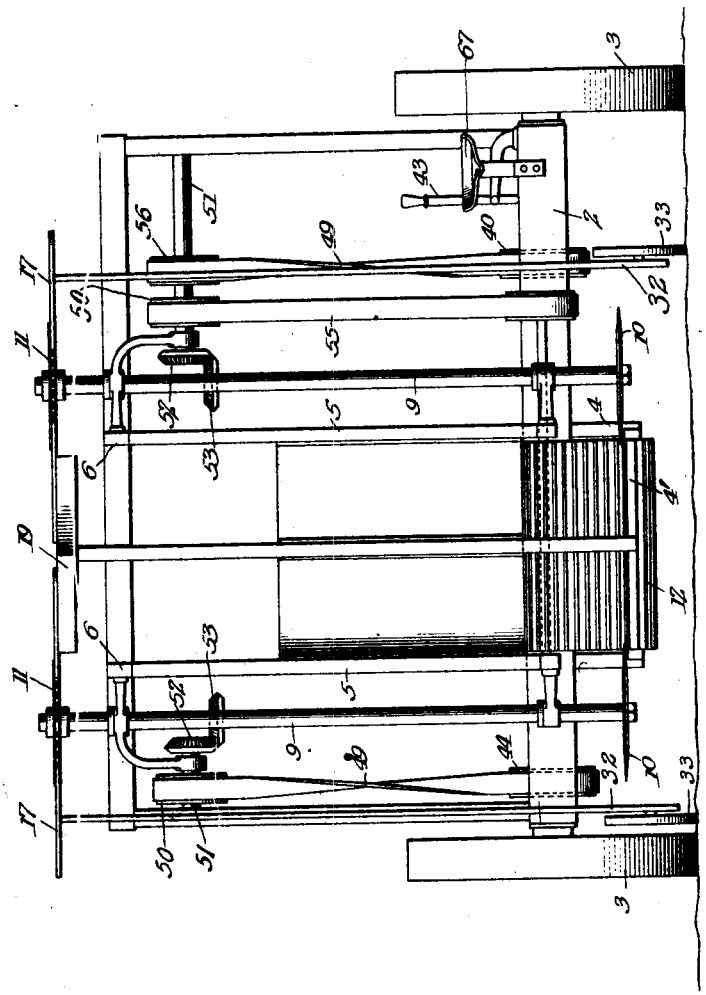
Figure 3 is a front elevation.

The operation of the machine may be briefly described as follows:

The parts being related as shown in Figures 1 to 3, that is, the bottom sections of the receiver, and the rearwardly swinging frame members 25, 27, thereof being in closed position and the clutch connecting the axle 4 and sleeve 40, the machine is drawn forward and the stalks of plants in two adjoining rows are severed by the cutter disks 10. The forwardly projecting spearlike head 19 cooperating with the fingers 17 of the chains 16 will cause the stalks as severed to pass onto the conveyor 12. It will be understood that the stalks will be supported in a substantially vertical position, their tops extending well above the plane of the chains 16 and the severed butts resting on the conveyor 12. Cooperation of the fingers 17 and the conveyor 12 will move the severed stalks, in substantially vertical position, rearward over the floor of the machine through the throat 21 and into the shock receiver at the rear of the machine.

When a sufficient quantity of stalks to form a shock of the desired size have accumulated in the receiver the machine will be stopped and the operatives standing on the platforms 60, 61, will manipulate the compressor 62, 63, and apply a suitable binder to encircle all of the stalks in the shock. The latch 30 will then be manipulated to disconnect the sections 22 and 23 of the receiver bottom and the lower rear member of the receiver frame swung rearward permitting the bottom sections 22, 23, to swing downward and allowing the shock to fall onto the ground in an upright position. The frame member 27, if necessary, may be swung rearward so that the machine may advance without disturbing the upright position of the shock.

After a shock has been thus discharged the bottom and rear frame members of the receiver will be restored to normal, closed position, and the clutch lever 43 being manipulated to engage the axle 4 and the sleeve 40, the machine can be again started and will operate to cut and convey to the receiver another series of stalks.

It will be evident that with such a machine the harvesting of plants growing in rows, such as corn, may be greatly facilitated and a complete shock quickly formed and discharged from the machine. The guides 19, 32, act to properly position any plants which may have been bent from a proper upright position so that all of the stalks severed will be guided into the machine and to the shock receiver at the rear thereof.

I claim:

1. In a harvester of the character described, the combination of a wheeled supporting frame provided at its forward end with means for cutting the stalks of plants in the path of the machine as it moves forward, a receiver for cut stalks at the rear end of the machine having a bottom formed of two members hinged to the frame to swing downward, a bar hinged at one end to the frame and extending across the rear edges of said bottom members, said bar having on one face a projection adapted to extend beneath said bottom members when they are in a horizontal position and assist in supporting them against vertical movement, a manually operable latch adapted to connect said bottom members when in horizontal position, and means for conveying stalks severed by the cutting means to said receiver.

2. In a harvester of the character described, the combination of a wheeled supporting frame provided with means for severing stalks of plants in the path of the machine as it moves forward, a receiver for cut stalks, means for conveying cut stalks in a substantially vertical position from the cutting means to said receiver, and means for compressing the stalks in the receiver into a shock comprising a curved member pivotally connected to a portion of the receiver frame and adapted to partially encircle the stalks in the receiver and a second member pivotally connected to the first said member and adapted to be adjusted to complete the encircling of said stalks.

3. In a harvester of the character described, the combination of a wheeled supporting frame, two disc cutters mounted at the front of said frame to rotate about parallel vertical axes and adapted to sever the stalks of plants in two adjoining rows as the machine moves forward, an endless conveyor supported by the frame and extending longitudinally thereof in the space between the axes of the cutters, a receiver for a series of cut stalks on the frame in rear of the conveyor, two endless chains extending about guide wheels mounted coaxial with and above the cutter discs and provided with laterally projecting fingers adapted to engage the upper portions of stalks being severed by the cutters and to move the severed stalks into position on the conveyor, the latter and said fingers on the endless chains operating to transport the severed stalks to the receiver, and means for rotating the cutters and actuating the endless chains.

4. In a harvester of the character described, the combination of a wheeled supporting frame, two pairs of vertical shafts supported in bearings on the frame, a cutter disc mounted on the lower end of each shaft and adapted to sever stalks of plants in the path of the machine, a sprocket on each said shaft, two endless chains each engaging the sprockets on the shafts at one side of the machine and provided with laterally projecting fingers, an endless conveyor arranged in the space between the cutter discs and extending upward and rearward from adjacent said cutters, and means for rotating the shafts, the fingers on the chains operating to assist in moving the severed stalks into position where their butts will rest on the conveyor and cooperating with such conveyor to move said stalks rearward of the machine.

5. In a harvester of the character described, the combination of a wheeled supporting frame, a shaft extending transversely of the frame and rotated by one of the frame wheels, two horizontal counter shafts mounted in bearings on the frame near the rear end thereof and connected with the wheel driven shaft, a vertical shaft adjacent each counter shaft, bevel gears connecting the vertical shafts and counter shafts, two vertical cutter shafts mounted on the frame near the front thereof, a disc cutter secured to the lower end of each cutter shaft and adapted to sever stalks of plants in adjoining rows as the machine moves forward, a sprocket on each vertical shaft, an endless conveyor mounted on the frame and extending upward and rearward from adjacent the cutters, means connecting one of the counter shafts with the driving shaft of the conveyor, and endless chains each engaging the sprockets on the two shafts at one side of the supporting frame and provided with a series of laterally projecting fingers adapted to engage the severed stalks, for the purpose described.

6. In a harvester of the character described, the combination of a wheeled supporting frame, a main shaft mounted in bearings on the frame, means operated by movement of the machine for actuating said shaft, two counter shafts mounted on the frame above the main shaft, means for transmitting motion from the main shaft to the counter shafts, two vertical shafts, each adjacent one of the counter shafts, gearing connecting the counter shafts and said vertical shafts, two vertical cutter shafts mounted in the frame in advance of the counter shafts, a cutter disc secured on the lower end of each cutter shaft, a sprocket mounted on each vertical shaft, a guide member extending forward from the frame and adapted to separate the plants in adjoining rows as the machine advances, an endless conveyor at the forward end of the frame extending upward and rearward from adjacent the cutters, means for driving said conveyor from one of the counter shafts, a receiver for cut stalks adjacent the rear of the supporting frame, and two endless chains each extending about the sprockets at one side of the machine, whereby the cutter shafts will be driven by said chains, and provided with laterally projecting fingers adapted to engage the upper portions of the severed stalks and cooperate with the conveyor to transport said stalks to the receiver.

In testimony whereof I affix my signature.

THOMAS D. THAWLEY.